United States Patent Office.

ALBION P. GEST, OF EVANSVILLE, INDIANA, ASSIGNOR OF A PART TO RONALD FISHER, OF SAME PLACE, AND WILLIAM H. SCUDDER, OF ST. LOUIS, MISSOURI.

COMPOUND FOR PRESERVING FOOD.

SPECIFICATION forming part of Letters Patent No. 237,855, dated February 15, 1881.

Application filed June 3, 1880. (No specimens.)

*To all whom it may concern:*

Be it known that I, ALBION P. GEST, a citizen of the United States, residing at Evansville, in the county of Vanderburg and State of Indiana, have invented certain new and useful Improvements in the Art of Preserving Fresh Meat, Fish, Game, and other Articles of Animal Food; and I do hereby declare the following to be a full, clear, and exact description of the invention, such as will enable others skilled in the art to which it appertains to make and use the same.

The object of my invention is to remove the oxygen from the articles to be preserved and to supply them with antiseptic material, so that they shall not be subsequently liable to putrefactive changes; and it consists of an improved compound for preserving food by fumigation.

To carry my invention into effect I suspend meat, game, fish, and other articles of animal food in an air-tight chamber which is filled with the products of the combustion of a compound of the following materials: flowers of sulphur, powdered willow charcoal, and borax. I find in practice that a convenient proportion of these materials is thirteen parts, by weight, of flowers of sulphur, two parts, by weight, of charcoal, and one part, by weight, of borax; but my invention embraces the use of a compound of these materials in any other suitable proportion.

I am aware that the method of preserving food by fumigating it in a close chamber is not new, and that a mixture of sulphur and charcoal for this purpose is old, and I do not claim as my invention the use of them alone, but the addition of borax gives results which greatly excel those heretofore obtained with any other like compound.

This compound is ignited and the combustion continues as long as oxygen is supplied.

In the preferred form the combustion-chamber is separate from the curing-chamber, so that the latter is not heated by the former; but there must be adequate communication for the passage of the oxygen from the curing to the combustion-chamber to supply the demands of combustion.

When the supply of oxygen from the open air is cut off the oxygen in the air of the chamber is first withdrawn, and then the articles to be preserved surrender the oxygen which they contain, and the antiseptic properties of the products of combustion so act upon the articles as to bring them to a condition in which they are not liable to putrefy.

Having thus described my invention, what I claim as new, and desire to secure by Letters Patent, is—

The compound of sulphur, charcoal, and borax for preserving food by fumigation, substantially as set forth and described.

In testimony whereof I affix my signature in presence of two witnesses.

ALBION P. GEST.

Witnesses:
O. A. BARTENWERFFER,
R. J. BROWN.